US007711235B2

(12) United States Patent
Riggsby et al.

(10) Patent No.: US 7,711,235 B2
(45) Date of Patent: May 4, 2010

(54) OPEN ARCHITECTURE FIBER OPTIC TRAY

(75) Inventors: Robert R. Riggsby, Sandy Springs, GA (US); William G. Mahoney, Suwanee, GA (US); Amy Hauth, Sugar Hill, GA (US); David Kirkpatrick, Lawrenceville, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 12/140,434

(22) Filed: Jun. 17, 2008

(65) Prior Publication Data

US 2009/0310927 A1 Dec. 17, 2009

(51) Int. Cl.
*G02B 6/00* (2006.01)

(52) U.S. Cl. ..................................... 385/135
(58) Field of Classification Search ........................ None
See application file for complete search history.

(56) References Cited

U.S. PATENT DOCUMENTS

| 4,428,645 | A | * | 1/1984 | Korbelak et al. | ............ | 385/135 |
|---|---|---|---|---|---|---|
| 7,359,609 | B2 | | 4/2008 | Mahoney et al. | | |
| 2002/0164144 | A1 | * | 11/2002 | Daoud et al. | ................ | 385/135 |
| 2003/0223723 | A1 | * | 12/2003 | Massey et al. | .............. | 385/135 |
| 2005/0100302 | A1 | * | 5/2005 | Schray | ........................ | 385/135 |
| 2007/0047896 | A1 | * | 3/2007 | Kowalczyk et al. | ......... | 385/135 |
| 2008/0050084 | A1 | * | 2/2008 | Sjodin | ........................ | 385/135 |
| 2008/0199139 | A1 | * | 8/2008 | Henderson | .................. | 385/135 |
| 2008/0212928 | A1 | * | 9/2008 | Kowalczyk et al. | ......... | 385/135 |

* cited by examiner

*Primary Examiner*—Sung H Pak
(74) *Attorney, Agent, or Firm*—Lewinski Law Group LLC

(57) ABSTRACT

In one embodiment a fiber tray include an arrangement of retaining slots configured to receive retaining clips in a variety of different orientations and sizes. Retaining clips may have standardized sizes to correspond with the arrangement of retaining slots and to secure a variety of components to the fiber tray in different locations and orientations. Fiber management means may be provided to guide fiber optic cable from the components in a variety of orientations and locations. The fiber tray may be configured to move between a stowed position within a node housing in which the mounting surface of the tray faces downward and an access position in which the tray faces upward. The tray may be transparent to allow a technician to view the fiber arrangement without moving the tray from the stowed position.

19 Claims, 19 Drawing Sheets

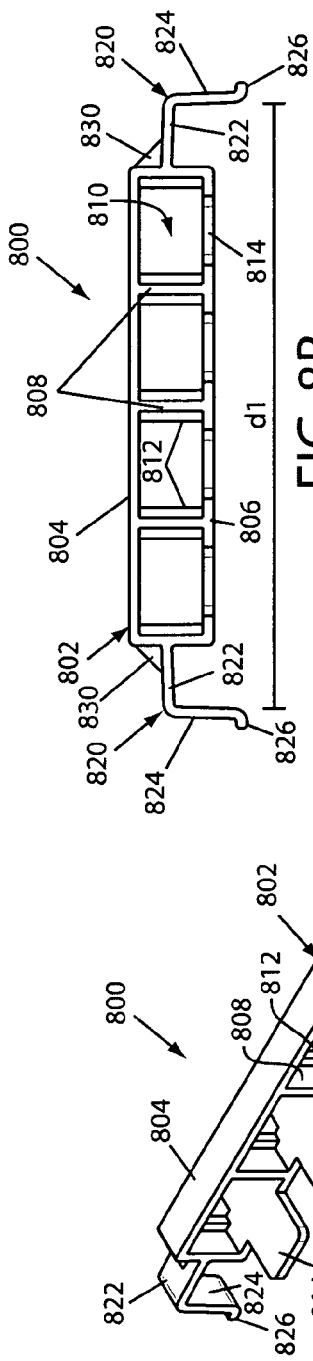
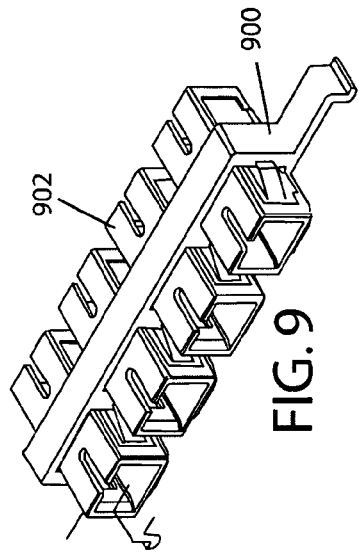
FIG.9
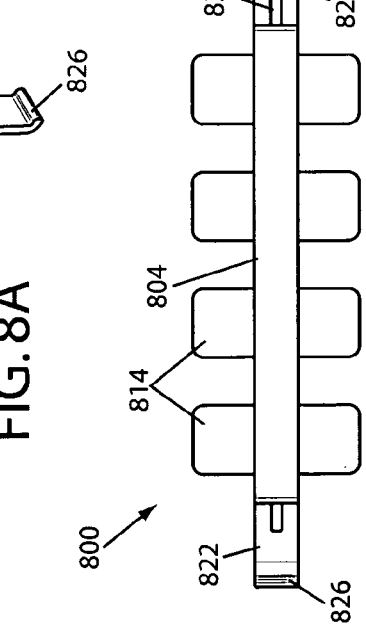
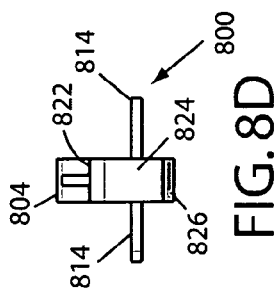
FIG.8D

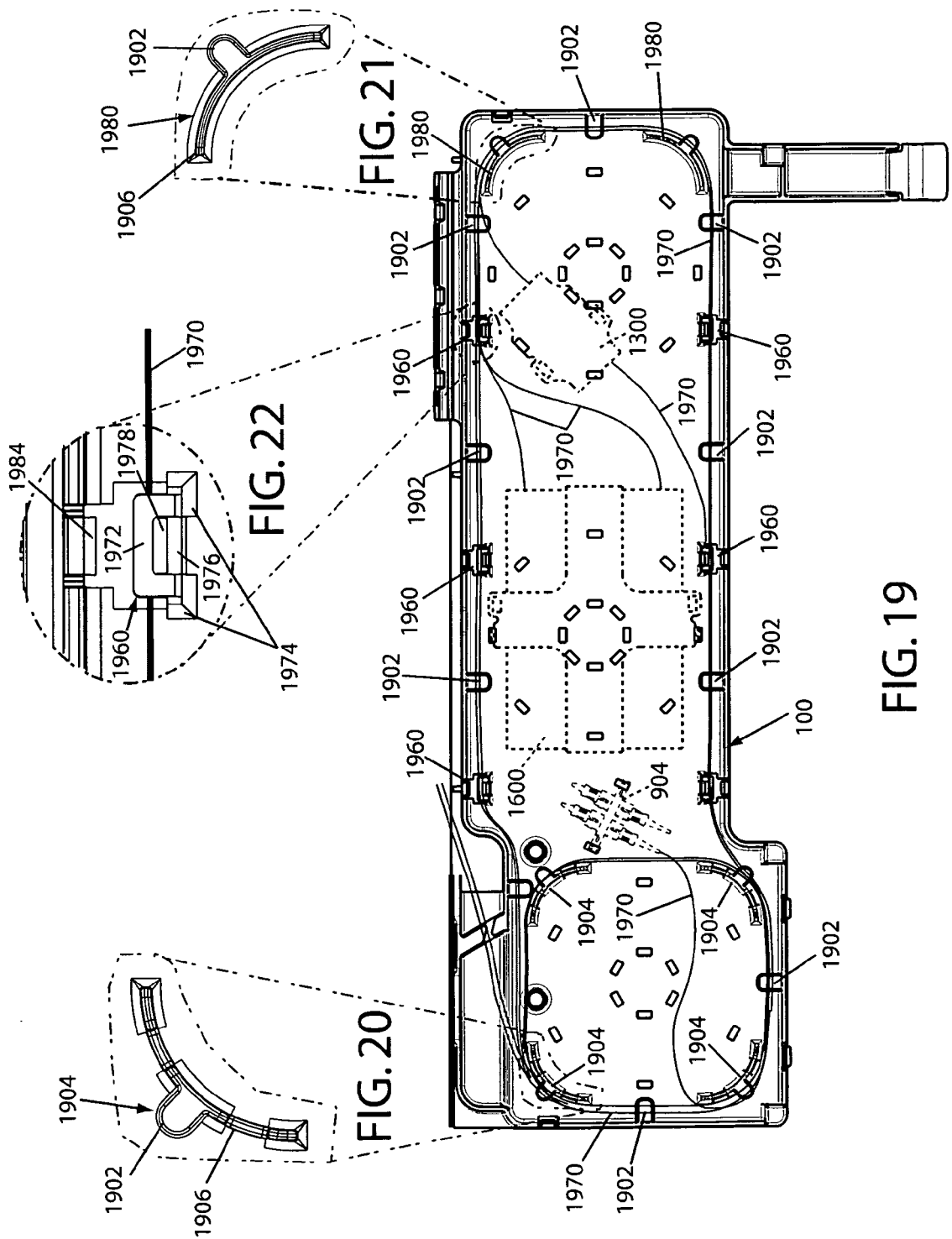

OPEN ARCHITECTURE FIBER OPTIC TRAY

TECHNICAL FIELD

The present disclosure relates generally to cable management and more particularly to cable management within a fiber tray.

BACKGROUND

Cable management is often difficult in CATV enclosures, such as Scientific-Atlanta's Gainmaker® or 1 GHz node, due to the large number of components that must fit within the small enclosure. Typically, a node contains a cable management system that is specifically configured for the particular arrangement of components and cable employed by the customer. In fiber optic applications, such as the GS7000 Node application, an assortment of components are needed to perform common tasks such as combining wavelengths, patching fibers together, splitting optical power, etc. These tasks are typically performed by a particular component or combination of components, such as Dense Wavelength Division Multiplexing (DWDM) modules and Optical Add-Drop Multiplexer (OADM) cassettes, filters, Course Wavelength Division Multiplexing (CWDM) modules, fiber storage devices, adapter bulkheads, etc. These components may be provided by a variety of different vendors and have a variety of different shapes and form factors. This makes it difficult to provide a cable and component management system that can readily accommodate the different modules and resulting cable patterns that different operators may employ.

For example, when an operator wants to upgrade to different components, he may need to rearrange the components to ensure a proper bend radius of cable. Newer, smaller components may provide space savings that would allow for additional components to be stored in the node, but which may also require different cable management techniques than those used with previous components. The inability to easily manage the components and associated cable may limit the capabilities that could otherwise be provided in the node. Furthermore, under many present systems it is difficult for a technician to easily determine the status of components or the particular arrangement without moving components or cables. Inadvertent shifting or misplacing of cables can lead to system performance problems.

BRIEF DESCRIPTION OF THE DRAWINGS

FIGS. 8A-8D illustrate an example embodiment of a component clip for securing components to a fiber tray.

FIG. 9 illustrates an exemplary embodiment of a fiber clip housing a plurality of bulkhead adapters.

FIG. 19 illustrates an example embodiment of a fiber tray showing cable management.

FIG. 20 shows an enlarged view of an example embodiment of a fiber guide wall of FIG. 19.

FIG. 21 shows an enlarged view of an example embodiment of a fiber guide wall of FIG. 19.

FIG. 22 shows an enlarged view of an example embodiment of a tie down guide of FIG. 19.

DESCRIPTION OF EXAMPLE EMBODIMENTS

Overview

Figure 1:
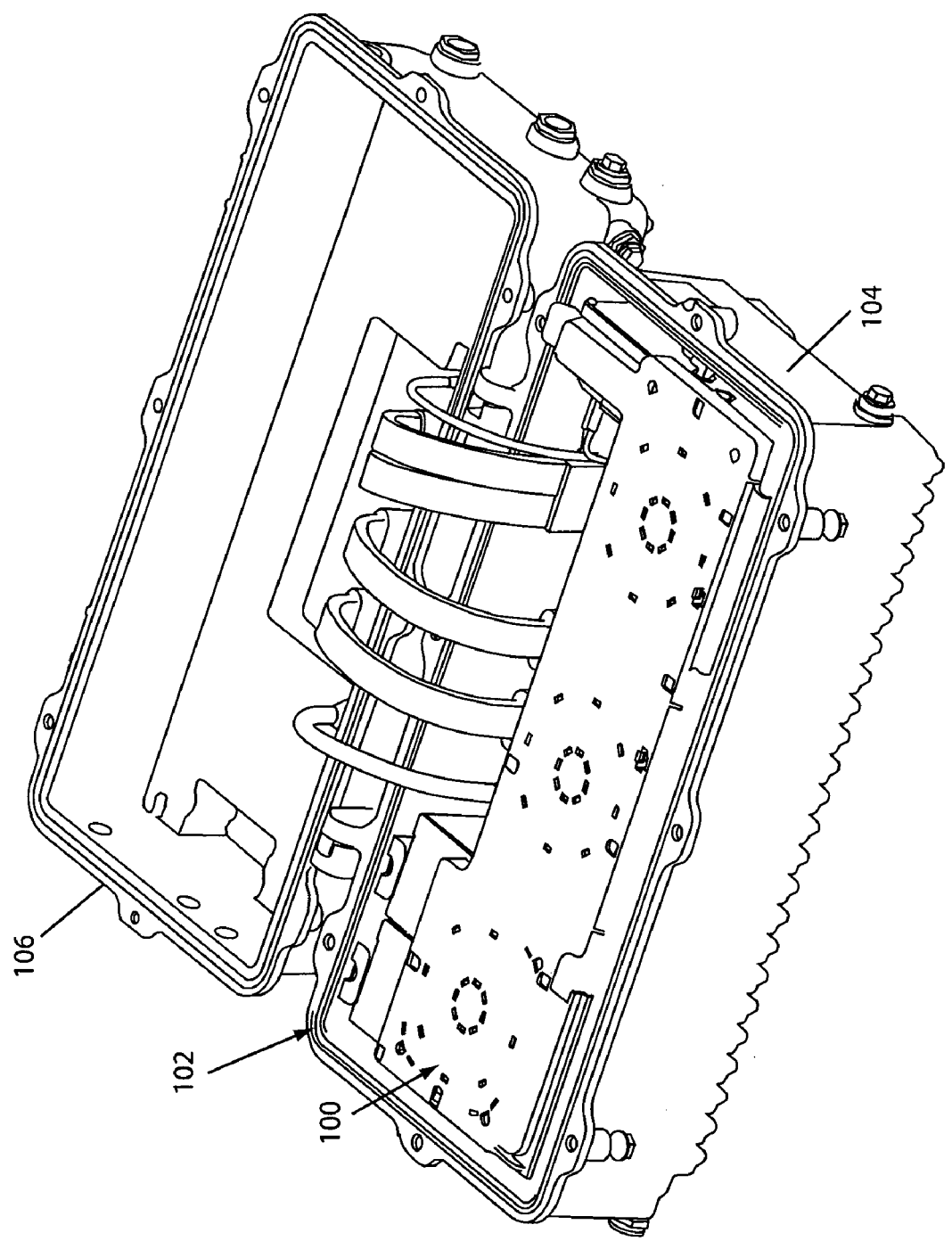
FIG. 1 illustrates an example fiber tray for managing optical components and cable within a node enclosure.

A fiber tray for use in an enclosure such as a CATV node provides the capability of handling a variety of different components and associated cable in a variety of different locations and orientations. In an exemplary embodiment, a tray includes a support surface having an indexed pattern of mounting slots thereon. The tray is configured for use with retaining clips adapted to secure components to the tray in a desired arrangement. The retaining clips may be configured to hold a component and mate with the retaining slots to secure the component to the tray. In an example embodiment, a plurality of retaining slot arrangements may be provided. One example retaining slot arrangement comprises an inner circular pattern of retaining slots and an outer circular pattern of retaining slots concentric with the inner pattern. In one example embodiment, the retaining slots are angled about the circle, and spaced at 45 degree intervals to provide a concentric arrangement of eight slots. In another example embodiment, the slots are spaced at 60 degree intervals to produce an arrangement of inner and outer six-slotted concentric circles.

These arrangements produce a circular retaining track comprised of pairs of aligned inner and outer retaining slots that allow for retaining clips to be secured to the tray at a variety of different orientations along the circular track. In addition, the arrangement produces rows of four aligned retaining slots at a variety of different angles that are configured to receive retaining clips.

A variety of retaining clips may be used in conjunction with the retaining slot arrangements. The retaining clips may be sized and configured to secure various components to the tray in different locations and orientations. For example, a retaining clip may comprise a body configured to receive a component thereon, and retaining legs configured to mate with retaining slots on the tray. The retaining legs may be spaced apart at different distances to correspond to different retaining slots on the tray. For example, in one embodiment, a retaining clip may include a body having housings for four bulkhead adapters and retaining legs spaced a distance apart to correspond to opposing outer retaining slots. In another embodiment, a retaining clip may be sized to receive two bulkhead adapters and have retaining legs spaced to correspond to an inner and outer retaining slot. Additional embodiments of retaining clips may be sized to secure CWDM modules or OADM cassettes to the tray. The clips may be configured so that multiple components share the same clip spacing to provide a flexible design orientation of components on the tray. The arrangement of retaining slots and associated retaining clips allows the user to secure a variety of components to the tray in a variety of locations and orientations.

The tray may also include other means for securing components to the tray. In one example embodiment, a tie down arrangement is provided in which a plurality of tie down guides configured for receiving a tie down strap are provided on the mounting surface of the tray. A tie down strap may be threaded through the tie down guide and a tie a down ring of a retaining clip to secure a component to the fiber tray.

In an example embodiment, the fiber tray is attachable to an existing fiber trough of a node and is movable between a stowed position and an access position. In one example embodiment, the components are coupled to a mounting surface on a first side of the tray which faces downward when the tray. The mounting surface faced downward in the stowed position and faces upward when the tray is in the access position thereby discouraging inadvertent technician contact with the components and associated cable.

The tray may be made of a clear material to allow an operator to see the routing of the fiber and the location and orientation of the components and various indicators, such as LEDs, from both the top and bottom of the tray, with the tray in either the stowed or access position. This helps prevent unnecessary fiber movement by a technician trouble-shooting a problem.

The tray may also be provided with cable management features that allow a multitude of arrangements of components on the tray. In one example embodiment, a plurality of guide tabs are provided about the tray periphery to retain fiber optic cable within the tray and prevent inadvertent displacement or pinching of the cable when opening or closing of the node. Guide walls may also be provided so that fiber may be routed with the desired bend radius. In one example embodiment, guide walls comprise curved protruding portions to provide a desired minimum bend radius and strain relief.

A cover may also be provided to further protect the components and associated cable stored on the tray, and prevent inadvertent contact with the components or cable. The tray may remain in the stowed position with the components and cable protected when the node is opened.

DESCRIPTION OF THE DRAWINGS

The present invention will be described more fully hereinafter with reference to the accompanying drawings in which like numerals represent like elements throughout the several figures, and in which exemplary embodiments of the invention are shown. The invention may, however, be embodied in many different forms and should not be construed as limited to the embodiments set forth herein; rather, the embodiments are provided so that this disclosure will be thorough and complete, and will fully convey the scope of the invention to those skilled in the art. The present invention is described more fully hereinbelow.

Turning to the figures, wherein like reference numbers refer to like features throughout the several views, FIG. 1 shows an example embodiment of a fiber tray 100 installed in an open enclosure in the form of a CATV node 102, such as a Gainmaker® GS700 node from Cisco Systems. The tray 100 provides for the management of a variety of components and associated cables as discussed in more detail below. The node 102 includes a first 104 and second 106 halves that may be opened and closed. As shown in FIG. 1, the tray 100 may be located within one half 104 of the node housing 102.

Figure 2:
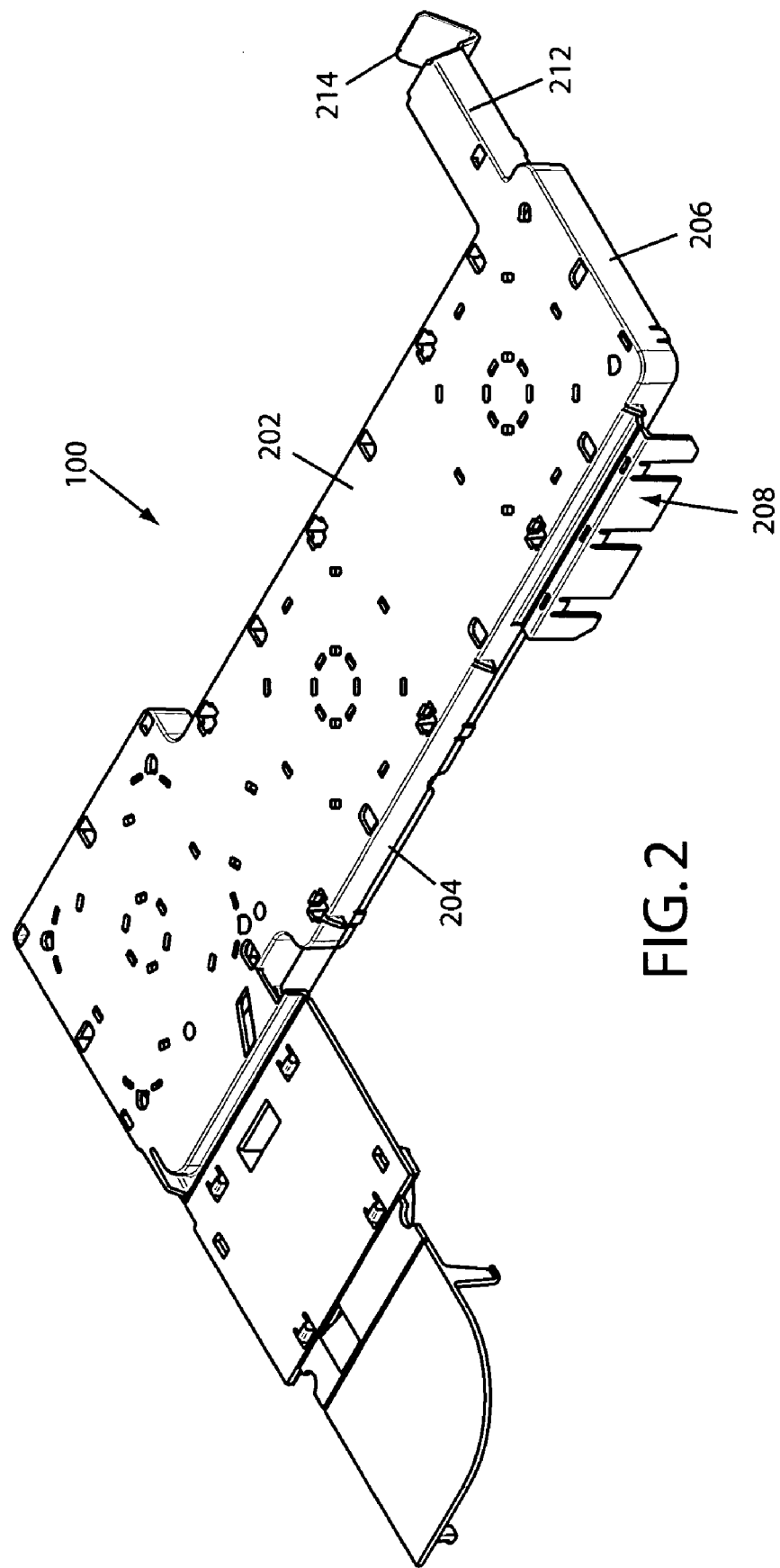
FIG. 2 illustrates a perspective view of an example embodiment of a fiber tray in a stowed condition.
Figure 3:
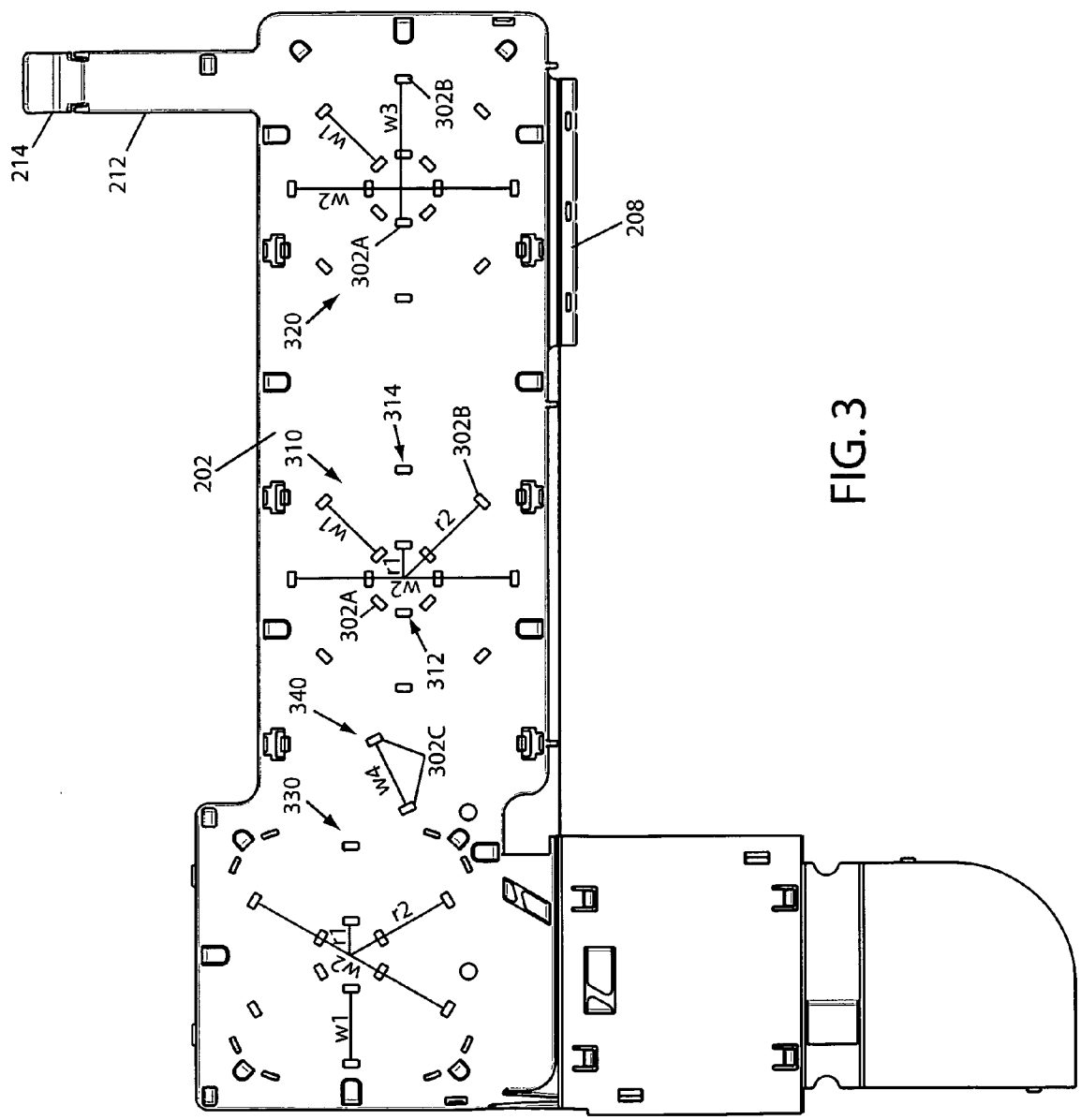
FIG. 3 illustrates a plan view of an example embodiment of a fiber tray.
Figure 4:
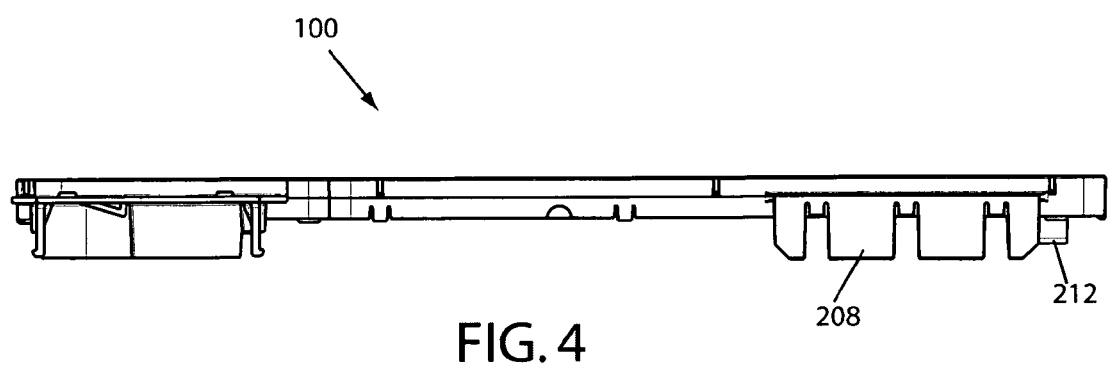
FIG. 4 illustrates a rear view of the fiber tray of FIG. 2.
Figure 5:
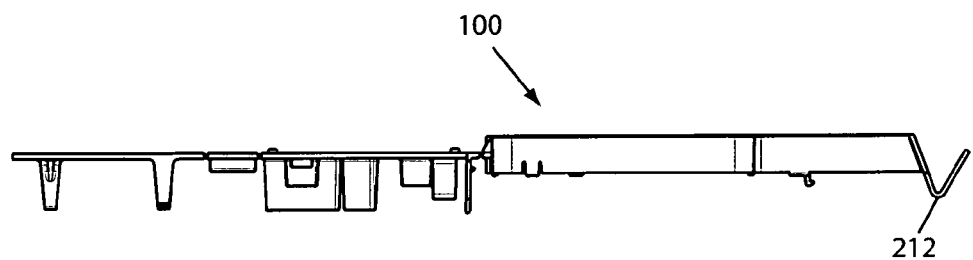
FIG. 5 illustrates a right side view of the fiber tray of FIG. 2.

FIGS. 2 and 3 shows a perspective and plan view of an example embodiment of a fiber tray 100 in a stowed position, the orientation observed by the technician upon opening the node 102. FIGS. 4 and 5 show a rear view and side view of the tray 100 of FIG. 3.

Figure 6:
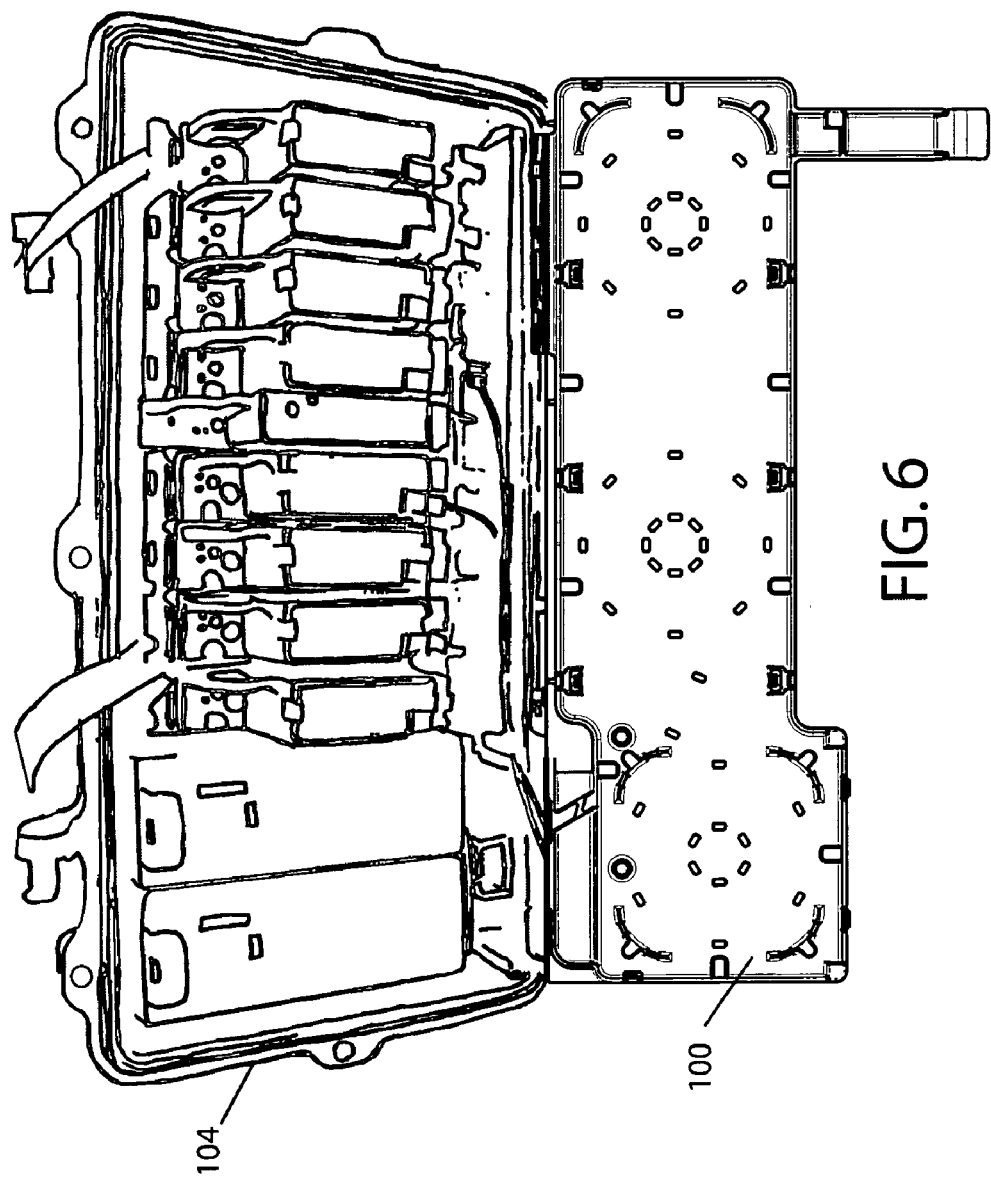
FIG. 6 illustrates an example embodiment of a fiber tray in an access condition.

While shown in a stowed position within a node half 104 in FIG. 1, the tray 100 may be moved between the stowed position and an access position out of the node half 104 as shown in FIG. 6. For example, as shown in FIGS. 2 and 7 the tray 100 may include a hinge 208 that is configured to cooperate with a portion of the node housing 104 to allow the tray 100 to rotate between a stowed position (FIG. 1) and an access position (FIG. 6).

The tray 100 may include a body that may comprise a generally planar panel 202 having sidewalls 204 and end walls 206. The body panel 202 may have a mounting surface 210 on one side upon which components and fiber cable may be secured. As discussed in more detail below, in the stowed position the tray 100 is oriented mounting surface 210 down (FIGS. 1-5) and in the access position the tray 100 is oriented mounting surface 210 up (FIGS. 6 and 7). Thus, as discussed in more detail below, components that are secured to the mounting surface 210 of the tray 100 are positioned on the underside of the tray 100 within the node half 104 when the tray is in the stowed position and on the upperside of the tray 100 out of the node half 104 when the tray is moved to the access position.

The tray 100 may include a latch 212 for releasably coupling the tray 100 to the node housing 104 so that the tray 100 can be retained in the stowed position when desired and released and moved to the access position when desired. In the example embodiment shown in FIG. 2, the latch 212 includes a V-shaped end 214 that may be wedged between a portion of the node housing 104 and a component within the node housing to provide a sufficient friction fit to hold the tray 100 in the stowed position. The end 214 may be compressible so that a user can simply squeeze the V-shaped end 214 to release the tray 100 from the stowed position.

Figure 7:
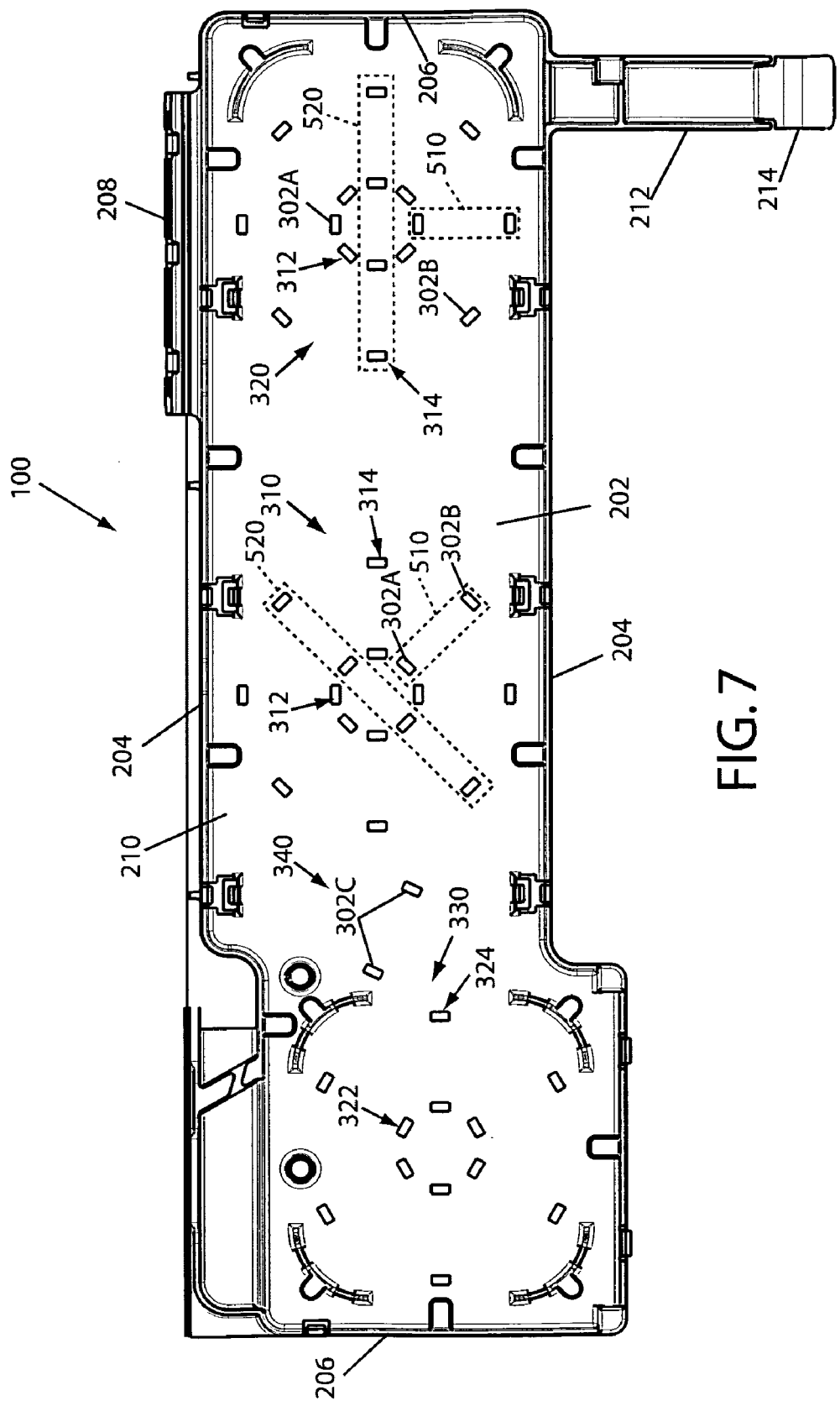
FIG. 7 illustrates a plan view of the fiber tray of FIG. 6.

As best seen in the example embodiments shown in FIGS. 3 and 7, the tray 100 may include a plurality of mounting slots 302 in the base panel 202 that are configured to secure components to the tray 100. The mounting slots 220 may be arranged in a predetermined pattern to secure components to the panel 202 in a various configurations.

In the example embodiment shown in FIGS. 3 and 7, mounting slots 302 are arranged to provide a plurality of mounting arrangements that allow components of different shapes and sizes to be secured to the tray at a variety of locations. In an example embodiment, mounting slots 302 may be arranged to form first 310, second 320, third 330 and fourth 340 mounting arrangements. The first mounting arrangement 310 may be located near the center of the tray 100 and include an inner arrangement 312 of inner retaining slots 302A and an outer arrangement 314 of outer retaining slots 302B that is concentric with the inner arrangement 312. For example, an inner arrangement 312 may comprise eight retaining slots 302A that are arranged in a circular pattern having a radius r1 with each retaining slot 302 spaced at 45 degree increments tangent to the circle so that each slot 302A has a corresponding slot 302A on the opposite side of the circle.

The outer mounting arrangement 314 may comprise outer retaining slots 302B arranged in a circular pattern concentric with the first mounting arrangement 310. In the example embodiment shown in FIGS. 3 and 7, the outer mounting arrangement has a radius r2 with the retaining slots 302B spaced at 45 degree increments like the inner mounting arrangement 312. This results in an arrangement 310 in which the inner slots 302A and outer slots 302B define a circular two-slot retaining track 510 (shown in dashed lines in FIG. 7). The retaining track 510 is configured for receiving and securing a retaining clip and an associated component to the tray 100 as described in more detail below. The arrangement 310 also provides a plurality of rows 520 (shown in dashed lines in FIG. 7) comprising two aligned inner 302A retaining slots and two aligned outer retaining slots 302B that form a four-slot row. In the example embodiment shown in FIGS. 3 and 7 r1 is about 0.5" and r2 is about 1.75" so that the retaining track 510 has a width w1 between slots of about 1.25" (r2-r1) and the distance w2 between opposing outer retaining slots 302B is about 3.5".

As also shown in FIGS. 3 and 7, a second mounting arrangement 320 similar to the first mounting arrangement 310 may be provided at a right portion of the tray 100. A third mounting arrangement 330 may be provided at a left portion of the tray 100, and comprise inner 322 and outer 324 concentric circular arrangements of inner 302A and outer 302B receiving slots. In this arrangement, both the inner 322 and outer 324 arrangements include six receiving slots 302 spaced at 60 degree intervals about the circle. The inner arrangement 322 may have a radius r1 and the outer arrangement a radius r2 to form a mounting track of a width w1 and mounting rows of a width w2 similar to that of the first 310 and second 320 mounting arrangements. A fourth arrangement 340 may include two retaining slots 302C spaced at about 1.25" apart, similar to the distance w2, and oriented about 25 degrees from horizontal. The retaining slots may be rectangular in shape having a width of 0.125 inches, and a length of 0.25 inches and oriented tangent to the circular arrangement.

As mentioned above, retaining slots 302 may be used in conjunction with retaining clips to secure components to the tray 100. Retaining clips may be configured for mounting a various components to the tray 100. In one example embodiment, a clip 800, shown in FIGS. 8A-8D, is configured for securing four bulkhead adapters 902 (FIG. 9) to the tray 100. The clip 800 may include a body 802 having upper 804 and lower 806 support portions, and a plurality of dividing walls 808 that together define a plurality of receiving housings 810 having open ends 812 for receiving a bulkhead adapter 902 therein. Protrusions 812 may be provided on the interior of the dividing walls 808 for engaging the bulkhead adapters 902 as known in the art. A plurality of platforms 814 may extend from the lower support 806 to support the bulkhead adapters 902.

Retaining legs 820 may be provided on opposing ends of the clip 800 and be configured for engaging retaining slots 302, securing the retaining clip 800 to the mounting surface 210. The legs 820 may include a generally horizontal extension 822 connected to a generally downwardly extending portion 824. A generally outwardly extending retaining tab 826 may be provided at the base of the downward extending portion 824. The legs 820 may be arranged so that the retaining tabs 826 may be inserted into retaining slots 302 in the tray 100 so that the tabs 826 extend through the panel 202 and engage the underside surface of the panel 202. The legs 820 may be provided with sufficient resilience to allow for the insertion of the tabs 826 into the retaining slots 302. A support wedge 830 may be provided to prevent the legs 826 from being overextended and damaged. The retaining tabs 826 thereby cooperate with the retaining slots 302 in the panel 202 of the tray 100 to retain the clip 800 and a component to the tray 100.

Figure 10:
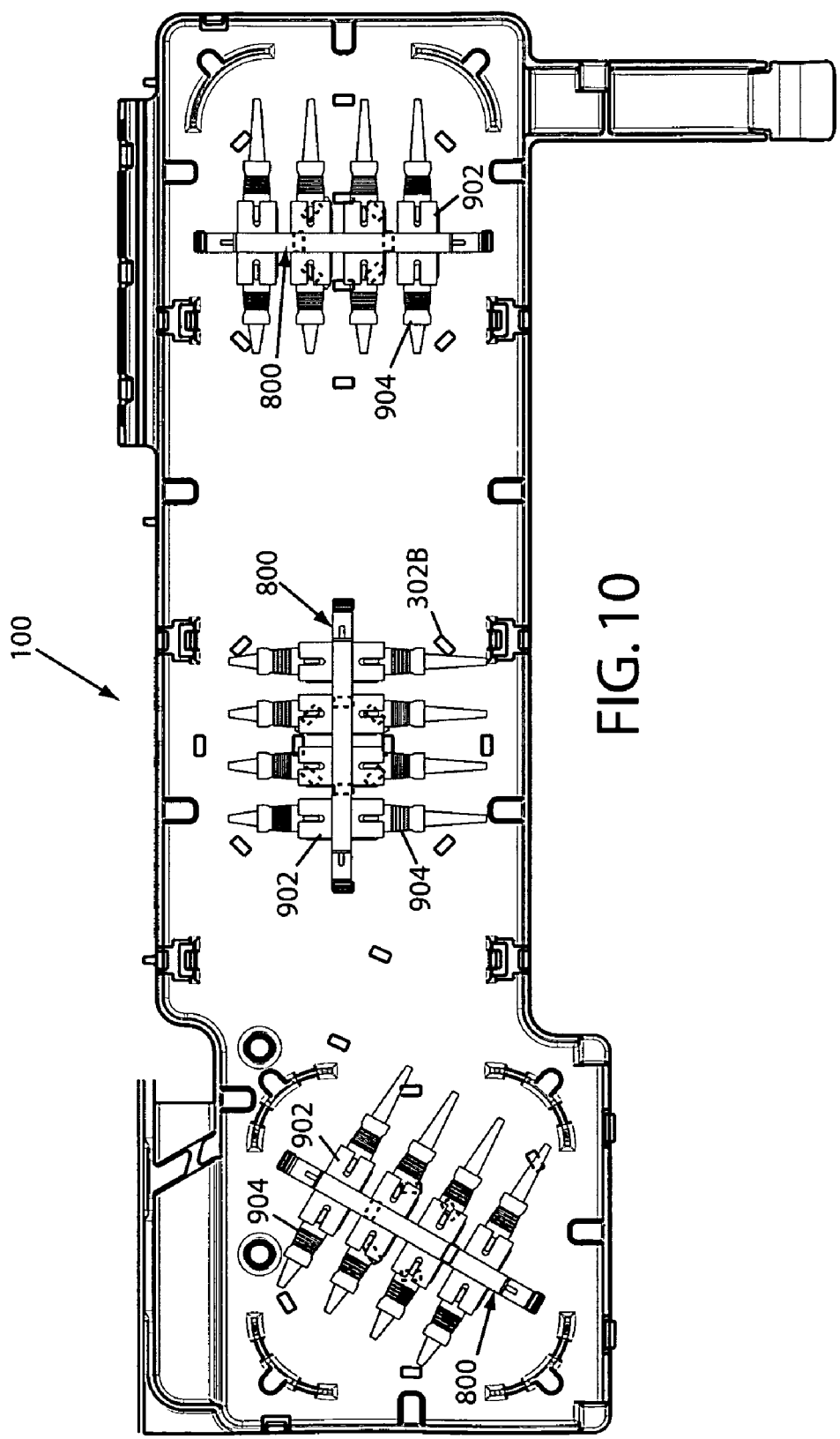
FIG. 10 illustrates an exemplary embodiment of an arrangement of components secured to a fiber tray.
Figure 11B:
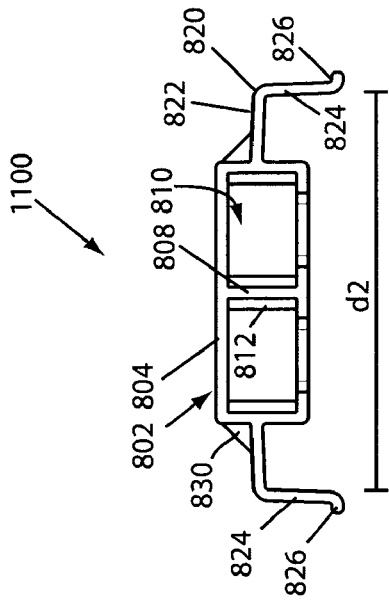
FIGS. 11A-11D illustrate an example embodiment of a component clip for securing components to a fiber tray.
Figure 11D:
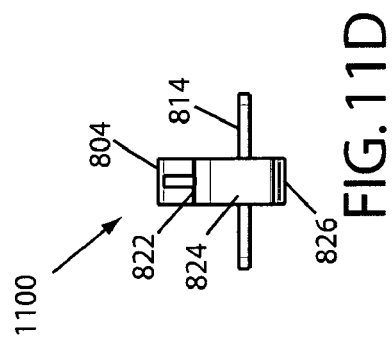
Figure 11A:
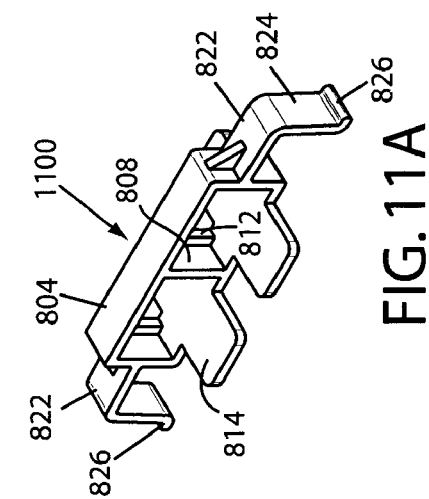
Figure 11C:
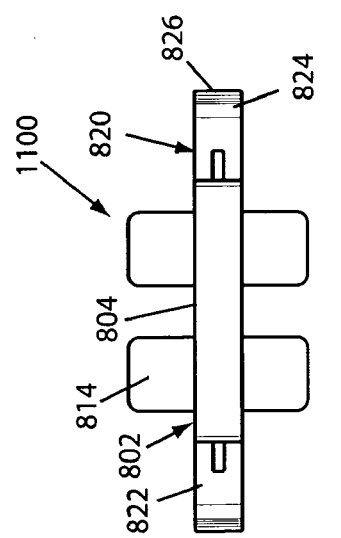

In the exemplary embodiment shown in FIGS. 8A-8D, the legs 820 are spaced a distance d1 apart so that the legs 820 correspond with the outer retaining slots 302B in the tray 100. As shown in FIG. 9, a retaining clip 900 may be configured to hold four bulkhead adapters 902. As shown in FIG. 10, the clips 800 may be used to secure bulkhead adapters 902 and associated bulkheads 904 to the tray 100 in a variety of locations and orientations.

Figure 12:
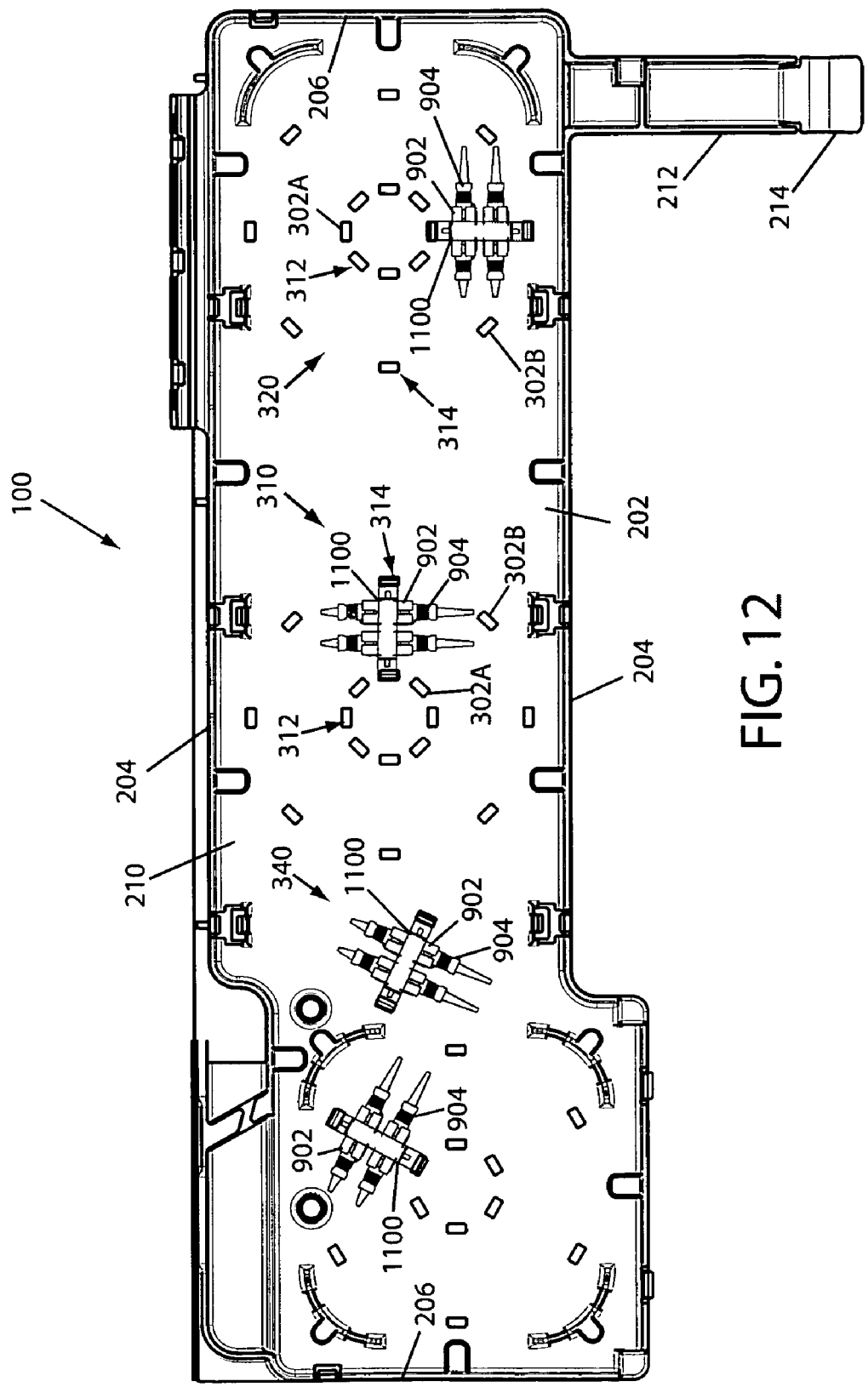
FIG. 12 shows an example embodiment of an arrangement of components on a fiber tray.

FIGS. 11A-11D show an example embodiment of a clip 1100 configured to hold two bulkhead adapters 902. The clips 1100 are similar to the clips 800 shown in FIGS. 8A-8D and have similar features such as upper 804 and lower 806 support portions, receiving housings 810, platforms 814, retaining legs 820 and retaining tabs 826 and will not be discussed in detail. The retaining legs 820 of the clip 1100 however are spaced apart a distance d2 that corresponds to the width w1 between an inner retaining slot 302A and an outer retaining slot 302B as shown in FIG. 3. As seen in FIG. 12, the clip 1100 in conjunction with the retaining slots 302 allows the bulkhead adapters 902 and associated bulkheads 904 to be secured to the tray 100 in a variety of locations and orientations. Of course the retaining clip 1100 could be sized to hold a different number of bulkhead adapters 902. For example, the retaining legs 820 could be spaced apart a distance d3 that corresponds to the width w3 shown in FIG. 3 between an inner retaining slot 302A and an outer retaining slot 302B.

Figure 13A:
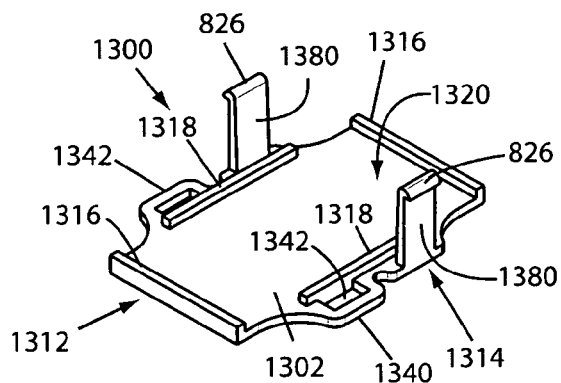
FIGS. 13A-13C illustrate an example embodiment of a component clip for securing components to a fiber tray.
Figure 13B:
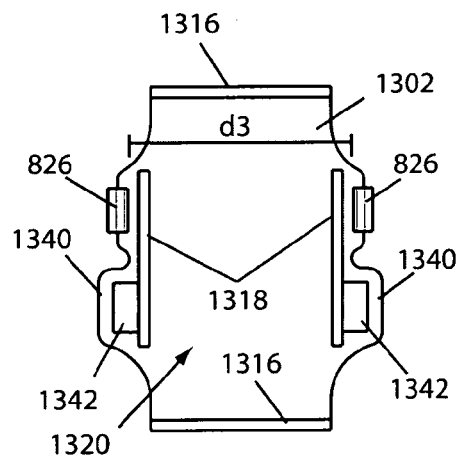
Figure 13C:
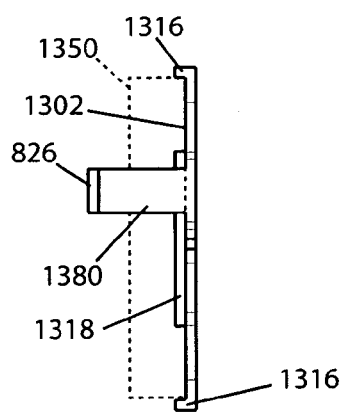

FIGS. 13A-13C show an exemplary embodiment of a retaining clip 1300 configured for securing a component 1350 to the tray 100. The retaining clip 1300 may include a generally planar body 1302 having ends 1312 and sides 1314. The ends 1312 may have upturned edges that form endwalls 1316. A raised portion may be provided to serves as sidewalls 1318. The end walls 1316 and sidewalls 1318 are arranged to serve as a receiving area 1320 for receiving a component 1350 (shown in dashed lines in FIG. 13C) on the body 1302.

The retaining clip 1300 may include generally vertical retaining legs 1380 having retaining tabs 826 on a distal end of the legs for cooperating with retaining holes 302 to secure the retaining clip 1300 to the tray 100. A tie ring 1340 may also be provided on opposite sides of the retaining clip. In the example embodiment, the tie ring provides a receiving hole 1342 configured to receive a tie down strap therethrough. The provides a means by which the retaining clip 1300 may be secured to the tray 100 without the use of the retaining slots 302, as described in more detail below.

Figure 14:
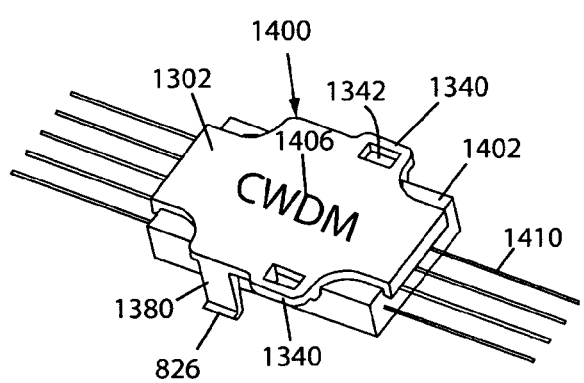
FIG. 14 illustrates an example embodiment of a component clip coupled to a module to be secured to a fiber tray.
Figure 15:
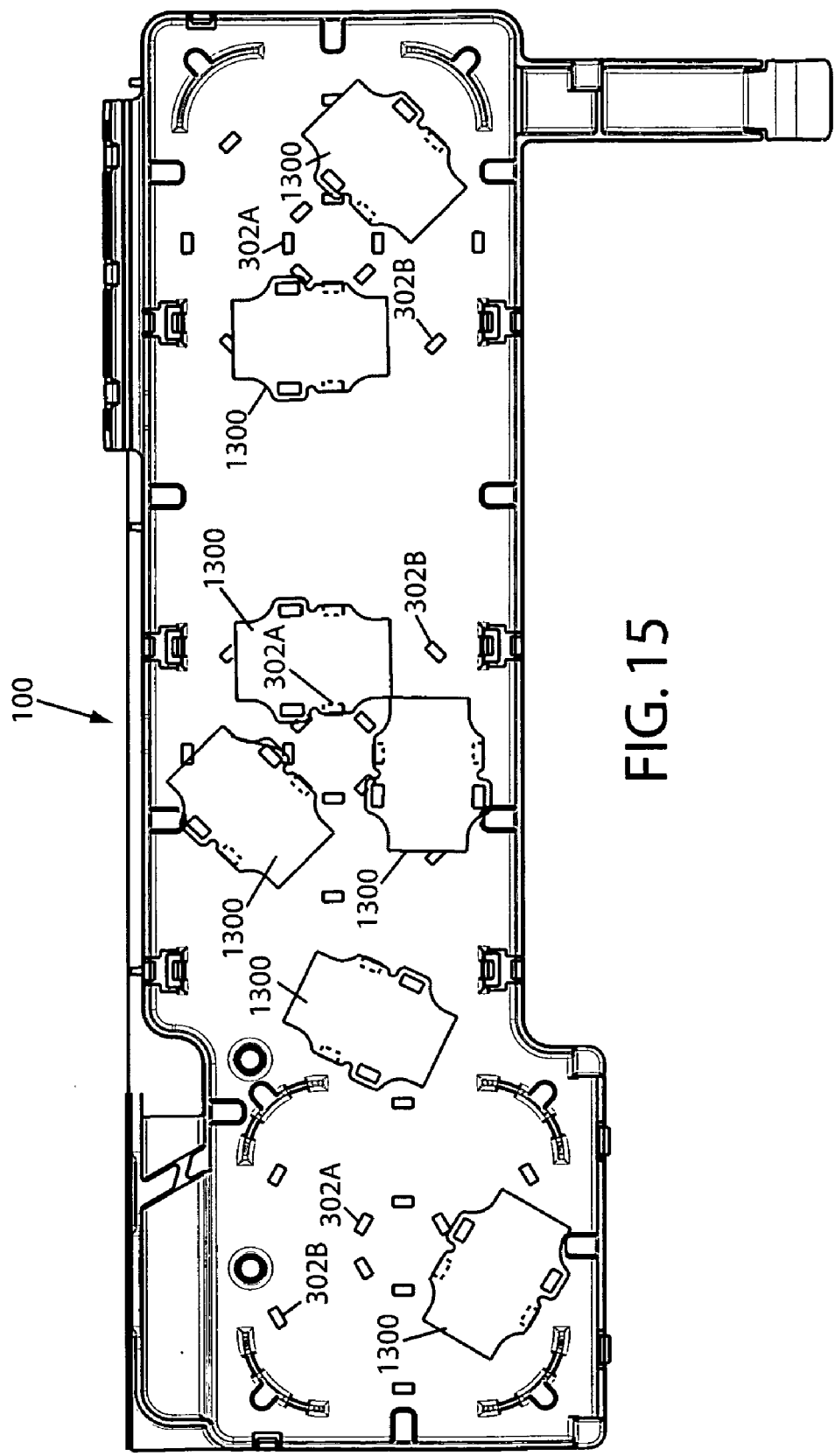
FIG. 15 illustrates an example embodiment of an arrangement of components on a fiber tray.

FIG. 14 shows an example embodiment of a retaining clip 1400 configured to hold a CWDM cassette 1402 having associated fiber optic cables 1410. The retaining legs 1380 may be spaced a predetermined distance apart to so that the retaining tabs 826 on the retaining legs correspond with retaining slots 302 on the tray 100. In this example embodiment, the retaining legs 1380 are spaced a distance d3 apart so that the retaining legs 1380 correspond to the width w1 between an inner retaining slot 302A and an outer retaining slot 302B in the first 310, second 320 and third 330 retaining slot arrangements as well as the width w4 between the retaining slots 302C of the fourth arrangement 340. The retaining legs 1380 are of sufficient length to extend beyond the CDWM module 1402 and engage the retaining slots 302. The retaining clip 1400 may also include indicia 1406 (FIG. 14) on the body 1302 to indicate the size of the clip, the type component suitable for use with the clip, or other information. As shown in an example arrangement in FIG. 15, the retaining clips 1300 may be used to secure CDWM modules 1402 to a tray 100 in a variety of different locations and orientations.

Figure 16:
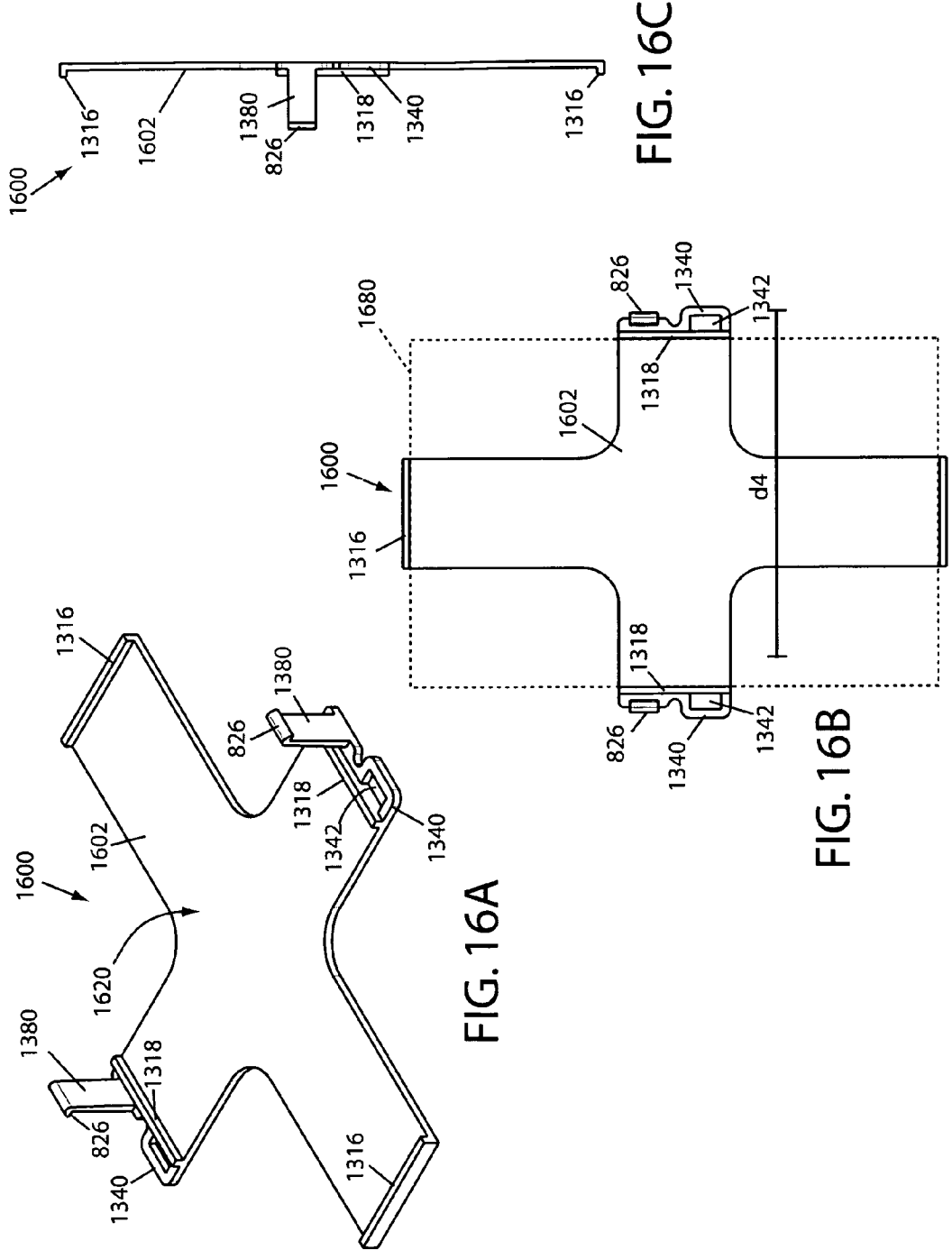
FIGS. 16A-16C illustrate an example embodiment of a retaining clip that may be used for securing components to a fiber tray.
Figure 17:
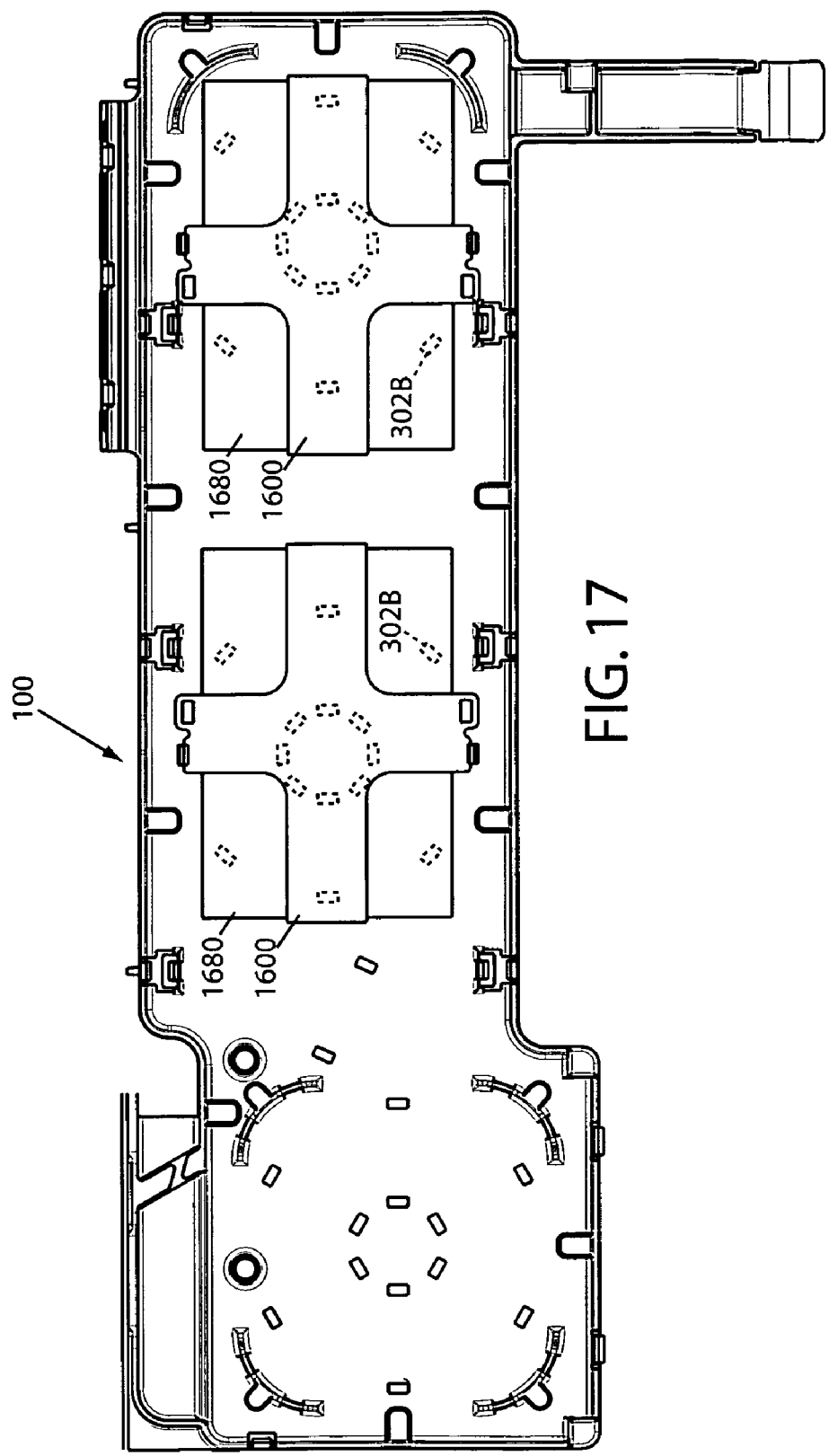
FIG. 17 illustrates an example embodiment of an arrangement of components on a fiber tray.
Figure 18:
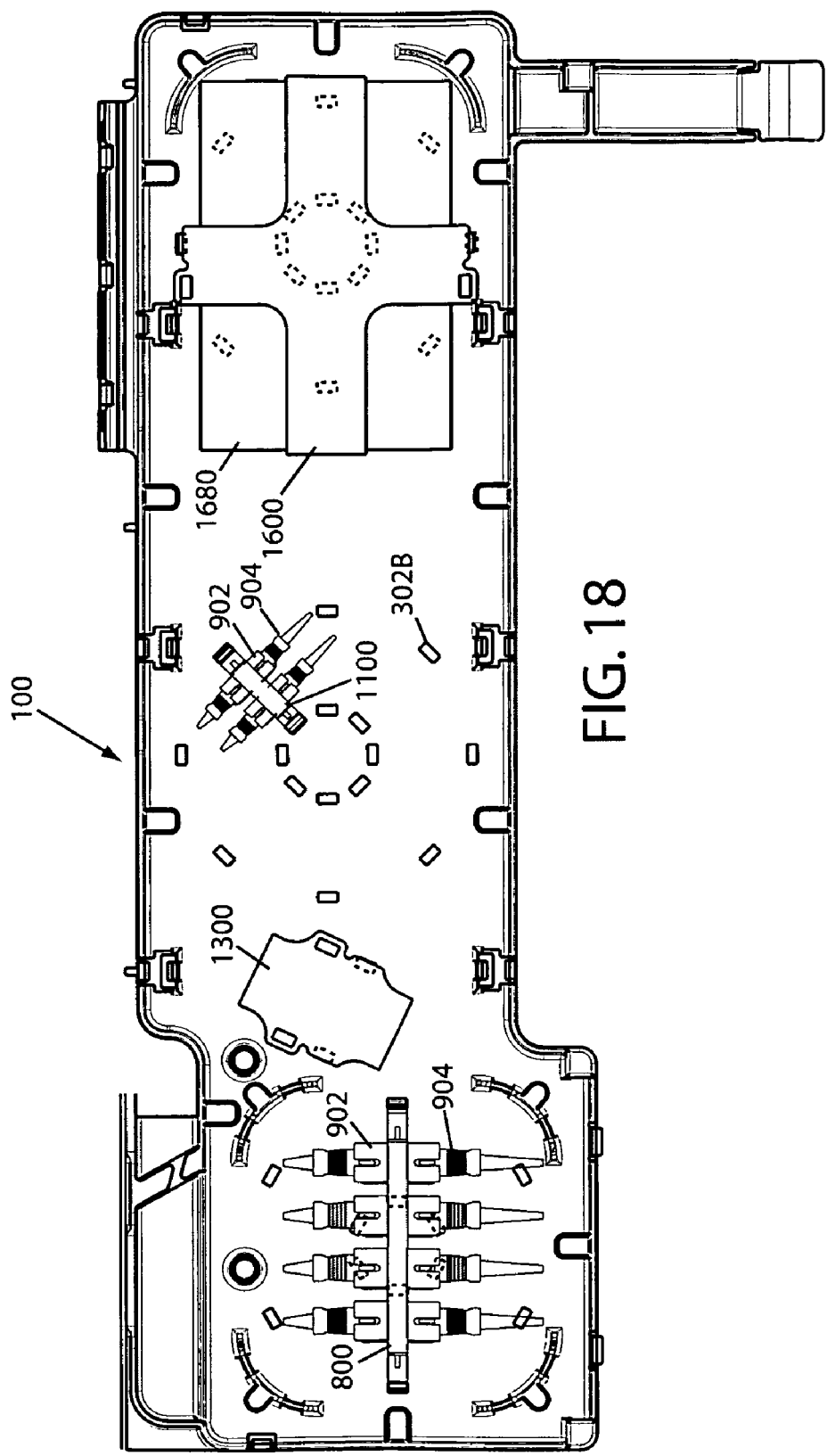
FIG. 18 illustrates an example embodiment of an arrangement of components on a fiber tray.

FIGS. 16A-16C shown an example embodiment of a retaining clip 1600 configured to secure a component 1680 (shown in dashed lines in FIG. 16B) to a fiber tray 10. The retaining clip 1600 may includes a cross-shaped body 1602 having endwalls 1316 and sidewalls 1318 for abutting the ends and sides of a component 1680 and that define a receiving space 1620 for receiving the component 1680. The retaining clip 1600 may be similar to retaining clip 1300 shown in FIGS. 13A-13C and may include retaining legs 1380 having end retaining tabs 826 for insertion into retaining slots 302 in the fiber tray 100. In the example embodiment of FIGS. 16A-C, the retaining legs 1380 are spaced apart a distance d4 so that the retaining tabs 826 correspond to retaining slots 302 in the fiber tray 100. In the example embodiment, the distance d4 corresponds to the distance w2 (FIG. 3) so that the retaining tabs 825 may be inserted into outer opposed retaining slots 302B. As shown in FIG. 17, the retaining clip 1600 can be used to secure a cassette 1680 to the fiber tray 100.

In addition to providing means for securing components to a fiber tray in a variety of different locations and orientations, the fiber tray 100 may include fiber management features for managing fiber optic cable. For example, as seen in FIG. 19, a plurality of guide tabs 1902 may be provided along the periphery of the tray 100. The guide tabs may include a generally horizontal tab portion 1904 to help retain the fiber to the tray 100.

Guide walls 1904 may also be provided to ensure a minimum bend radius for fiber 1970 associated with various components (shown in dashed lines in FIG. 19) that may be secured to the fiber tray 100. In the example embodiment shown in FIG. 19, four guide walls 1904 are positioned in opposing corners of the third mounting arrangement 330 to provide a guide path with a minimum bend radius for fiber optic cable 1970. As seen in magnified view in FIG. 20, the guide wall 1904 may include a curved protrusion 1906 extending upward from the tray base panel 202 and a horizontal tab 1904 extending from the protrusion. The curved protrusion 1906 may have a radius of curvature to provide a desired bend radius for cable used with the tray. In the exemplary embodiment, the guide wall 1904 may have a radius of curvature of 1.5" which is a minimum bend radius that is frequently employed for fiber optic cable 1970.

Two guide walls 1980 may also be provided at the upper and lower right corner of the tray as shown in FIG. 19 and provide a guide about the second mounting arrangement 320. These guide walls 1980 may also include a curved protrusion 1906 and a horizontal tab 1902 for providing a desired bend radius to fiber optic cable 1970 and retaining the cable 1970 on the tray 100. As seen in FIG. 19, the guide walls and tabs effectively manage cable that is positioned around components secured to the tray 100 such as CDWM module 1300, OADM cassette 1600 and bulkheads 904 (shown in dashed lines).

Tie down guides 1960 may also be provided on the tray 100 to further manage fiber optic cable 1970 and secure components to the fiber tray 100. In addition to serving as a guide tab, the tie down guide 1960 may serve as a tie down anchor configured to receive a tie down strap for securing components to the fiber tray 100. In the example embodiment shown in FIGS. 19 and 22, the tie down guide 1960 includes a tie down ring 1972 that is elevated from the tray by supports 1974. The tie down ring 1972 in conjunction with a cross bar 1976 defines a receiving space 1978 for receiving a tie down strap therethrough. A rear tab 1984 may also be provided to assist in managing the cable 1970.

Figure 23:
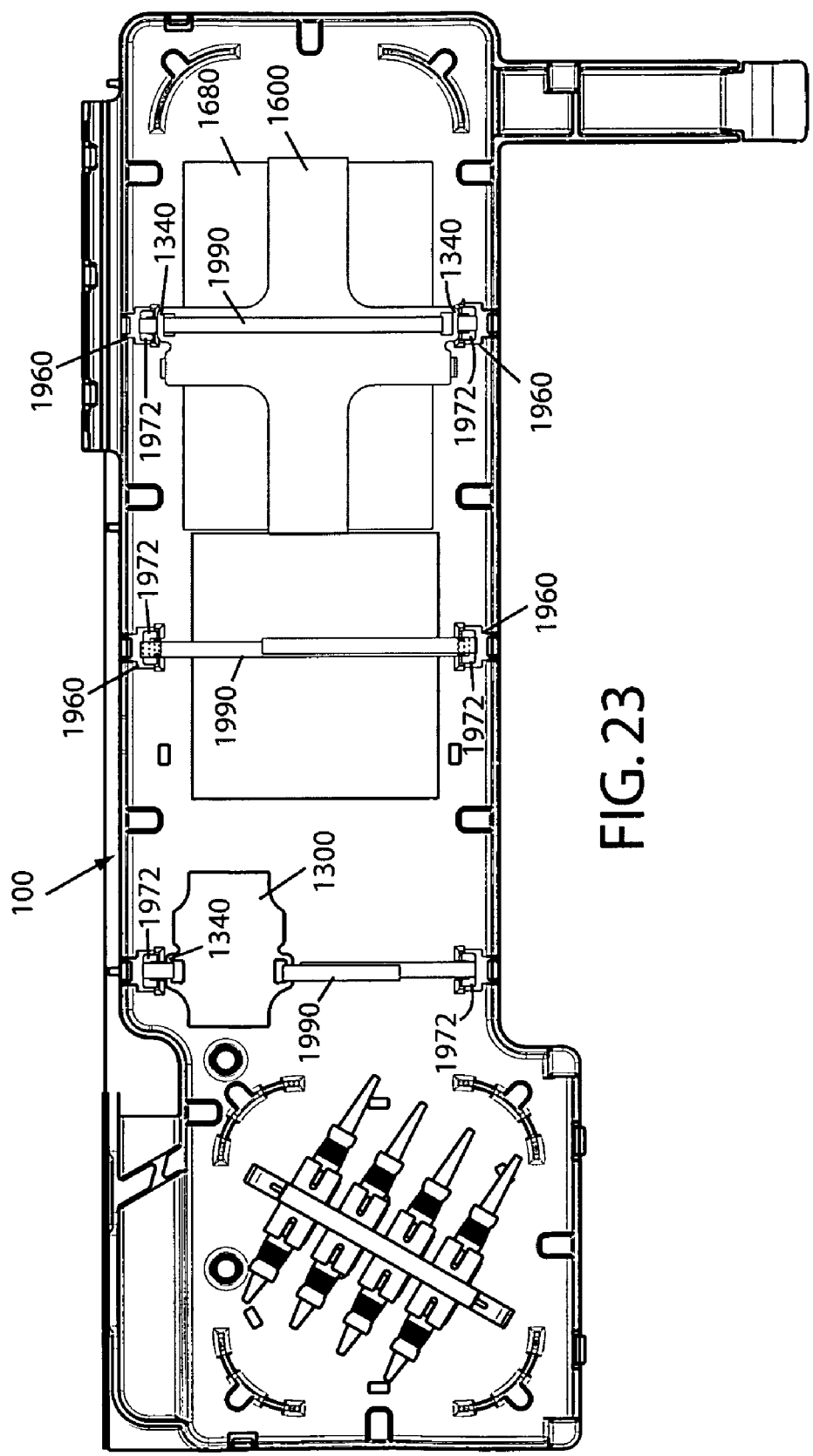
FIG. 23 shows an example embodiment of an arrangement of components on a fiber tray in which the components are secured to the tray using a tie down arrangement.

In the arrangement shown in FIGS. 19 and 23, tie down guides 1960 are aligned on opposing sides of the tray to provide an aligned receiving path for a tie down strap 1990. The tie down ring 1972 not only acts as a retaining tab to assist in retaining fiber optic cable 1970 to the tray but also serves as a tie down anchor. The tie down ring may extend generally horizontally.

In the example embodiment shown in FIG. 22, the opening 1978 maybe of a size to receiving a tie down strap 1990. The tie down strap 1990 may be threaded through the tie down ring 1972 of the tie down guide 1960 and threaded through a retaining ring 1340 provided on a retaining clip 1600 used to secure the component to the fiber tray. For example, in FIG. 23 a tie down strap 1990 is threaded through the tie down rings 1972 and retaining rings 1340 provided on retaining clips 1300 and 1600. This provides a means by which components can be secured to the fiber tray 100 without the use of the retaining slots 1302. Thus, while in some example embodiments retaining clips are shown with retaining legs and tie down rings, retaining clips can include one or the other or both. A variety of different tie down straps 1990 could be used. For example, double sided tape, hook and loop fastener tape or strap, or other means could be used.

Figure 24:
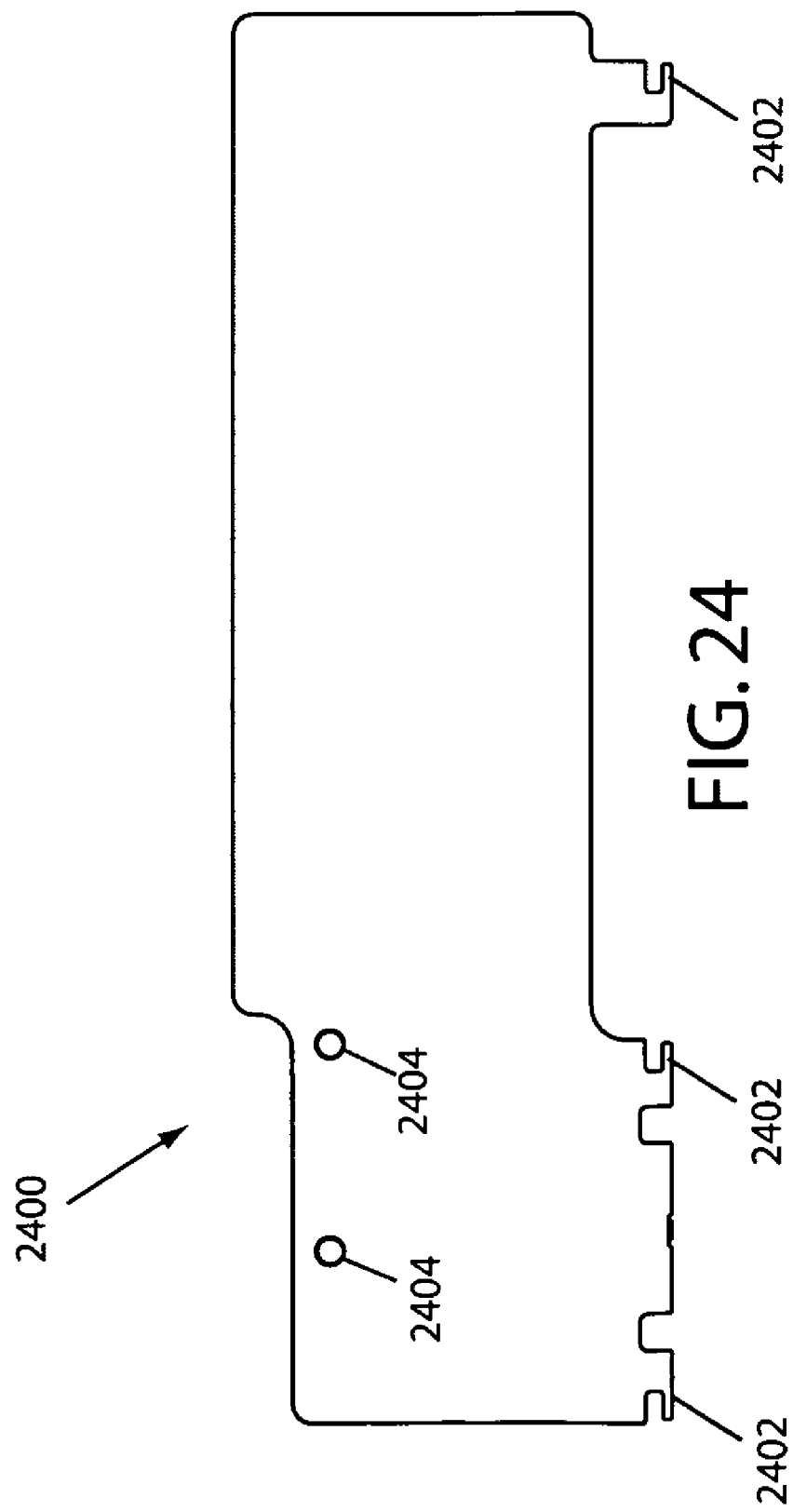
FIG. 24 shows an exemplary embodiment of a cover for use with a fiber tray.
Figure 25:
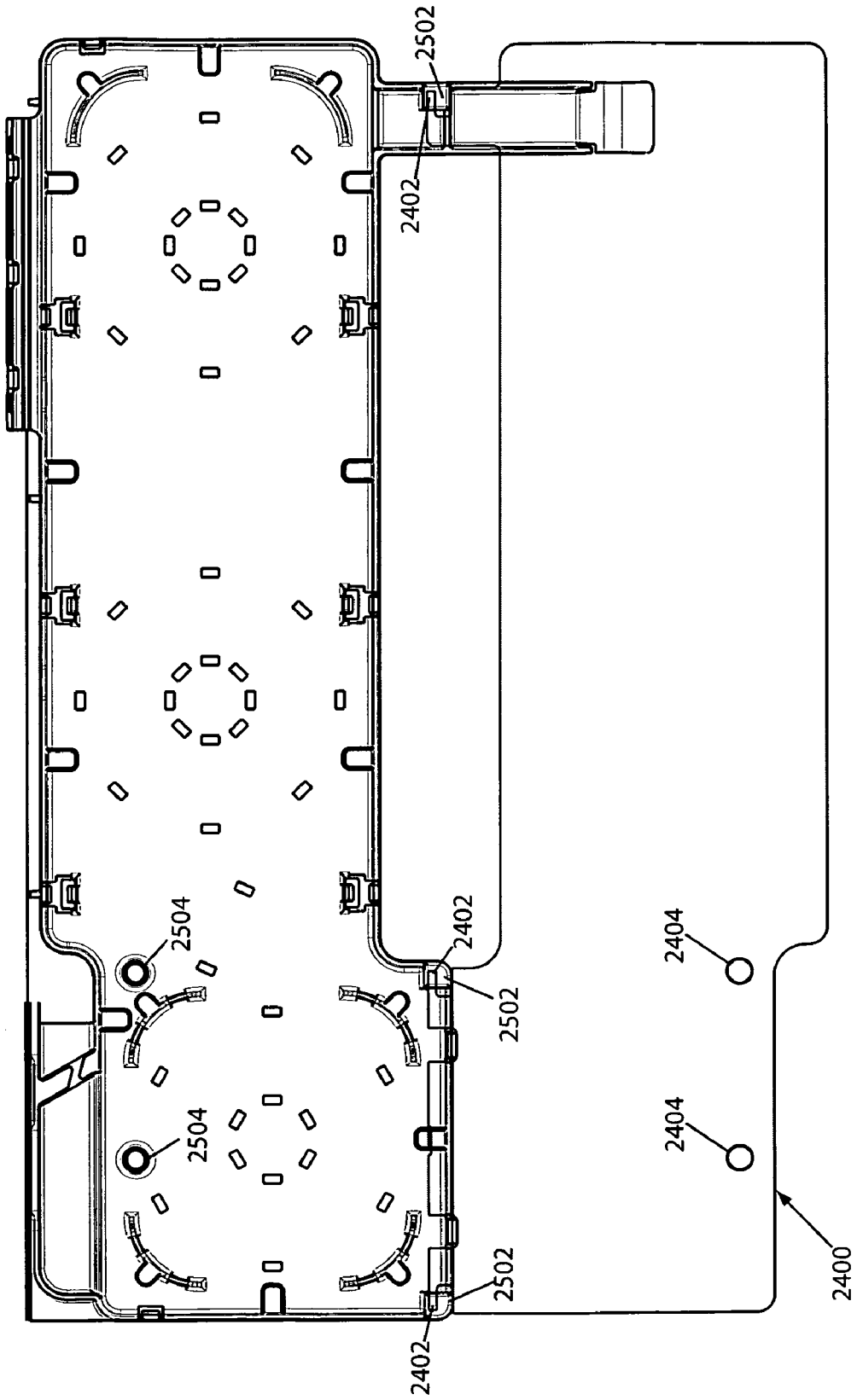
FIG. 25 shows an exemplary embodiment of a fiber tray with a cover in an open position.

As shown in FIG. 1, the tray 100 may be shaped to allow access to some components within the node half 104 when the tray 100 is in the stowed position. As explained above, the fiber tray 100 may be movable between a stowed condition (FIG. 1) and an access position (FIG. 4). To further protect the components and fiber on the tray 100 a cover 2400 may be attached to the tray 100. In the example embodiment shown in FIG. 24, the cover 2400 may be made of clear material to allow for a technician to view the tray and its components with the cover closed. The cover 2400 may be shaped to conform to the shape of the tray 100 and may be hingedly attached to the tray to allow the cover to be rotated from an open and closed position. In the exemplary embodiment shown in FIGS. 24 and 25 the cover includes hinge pins 2402 that fit within receiving nodes 2502 of the tray 100. The cover may also include a pair of apertures 2404 that are configured to removably mate with pins 2504 which extend upward from the tray 100 in FIG. 24.

The tray 100 allows a user to install any number of components, (such as DWDM, CWDM, splitters, bulkhead connectors, etc.) in any number of locations in any number of orientations while still providing a clean, neat and organized routing capability for the end user. The retaining clips are configured to hold standard and non-standard components such as bulkheads, and the tray 100 allows the clips to be installed in a 360 orientation to provide optimal access in multiple locations. The clips may be configured so that multiple optical components share the same clip spacing to allow for a flexible design orientation. Multiple component clip sizes may be standardized to allow multiple components to be installed in the same location in the event these applications are needed in conjunction with each other or separately. The retaining slots 302 in the tray 100 provide the ability to install multiple components in the tray 100 at the same time in multitude of combinations to suit the customer's needs. Options for tray coloring include both colored and a clear version that allows the customer to see the routing of the fiber and location of the components from both top and bottom and also allow indicators such as LED's to be seen through the fiber tray with minimal fiber optic movement for potential debugging purposes.

The tray 100 does not limit the user to pre-defined locations for component installation or limit the customer to a pre-defined vendor set or size constraints for the components. The tray 100 provides for a flexible open architecture when setting up an optical fiber tray to maximize the efficiency of the installation will providing the framework for a clean organized work space that will maintain safety and durability of the optical components.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments.

What is claimed is:

1. An apparatus comprising:
a fiber tray having a mounting surface; and
a first arrangement of retaining slots arranged in an inner circular pattern and an outer circular pattern concentric with the inner circular pattern, the first arrangement of retaining slots provided at a first mounting location on the tray, the first arrangement of retaining slots configured to receive a first retaining clip of a first size in a plurality of orientations, the first retaining clip configured to secure a first fiber optic connector to the mounting surface, and configured to receive a second retaining clip of a second size in a plurality of orientations, the second retaining clip configured to secure a second fiber optic connector to the mounting surface.

2. The apparatus of claim 1, wherein the retaining slots of the inner circular pattern of retaining slots are aligned with the retaining slots of the outer circular pattern of retaining slots.

3. The apparatus of claim 1, further comprising a fiber management device provided on the tray configured to manage fiber optic cable associated with the first fiber optic connector in each of the plurality of orientations and the second fiber optic connector in each of the plurality of orientations.

4. The apparatus of claim 3, wherein the fiber management device comprises a plurality of guide walls configured to provide a minimum bend radius to fiber optic cable extending from the first fiber optic connector and second fiber optic connector.

5. The apparatus of claim 4, further comprising a plurality of guide tabs.

6. The apparatus of claim 1 wherein the first fiber optic connector is a Dense Wavelength Division Multiplexing (DWDM) module and the second fiber optic connector is an Optical Add Drop Multiplexer (OADM) cassette.

7. The apparatus of claim 1, further comprising a second arrangement of retaining slots provided on the fiber tray at a second mounting location on the tray, the second arrangement of retaining slots configured to receive the first retaining clip in a plurality of orientations and the second retaining clip in a plurality of orientations.

8. The apparatus of claim 7, further comprising a second fiber management device provided on the tray, the second fiber management device configured to manage fiber optic cable associated with the first fiber optic connector and the second fiber optic connector in each of the plurality of orientations.

9. The apparatus of claim 1, further comprising tie down means for securing a component to the tray.

10. The apparatus of claim 9, wherein the tie down system comprises a tie down guide provided on the fiber tray adapted to receive a tie down strap.

11. The apparatus of claim 1, further comprising a hinge configured to rotatably couple the fiber tray to a node housing.

12. The apparatus of claim 11, wherein the hinge is configured to rotate the tray between a stowed position within the node housing in which the mounting surface of the tray faces downward within the node housing and an access position in which the tray is outside the node housing with the mounting surface facing upward.

13. The apparatus of claim 1, wherein the fiber tray is transparent.

14. The apparatus of claim 1, further comprising a movable cover configured to cover components secured to the mounting surface of the fiber tray.

15. An apparatus comprising:
a node housing having a first node half and a second node half;
a fiber tray having a mounting surface configured to secure components thereto and a first arrangement of retaining slots arranged in an inner circular pattern and an outer circular pattern concentric with the inner circular pattern, the inner circular pattern of retaining slots configured to secure a first fiber optic connector to the mounting surface, and the outer circular pattern configured to secure a second fiber optic connector to the mounting surface.

16. The apparatus of claim 15, further comprising a retaining clip coupled to a fiber optic device and engaged with the inner circular pattern of retaining slots to secure the fiber optic device to the fiber tray in a first orientation.

17. The apparatus of claim 16, further comprising fiber management means provided at a periphery of the fiber tray for managing fiber optic cable about the tray.

18. The apparatus of claim 16, further comprising a second retaining clip coupled to a second fiber optic device and engaged with the outer circular pattern of retaining slots.

19. The apparatus of claim 15, further comprising a second arrangement of retaining slots arranged in an inner circular pattern and an outer circular pattern.

* * * * *